United States Patent [19]

Fock et al.

[11] 4,371,683
[45] Feb. 1, 1983

[54] HARDENABLE ADHESIVE

[75] Inventors: Jürgen Fock, Düsseldorf; Dietmar Schedlitzki, Essen; Ulrich Holtschmidt, Essen; Wilhelm Ahrens, Essen, all of Fed. Rep. of Germany

[73] Assignee: Th. Goldschmidt AG, Essen, Fed. Rep. of Germany

[21] Appl. No.: 356,292

[22] Filed: Mar. 10, 1982

[30] Foreign Application Priority Data

Apr. 1, 1981 [DE] Fed. Rep. of Germany ....... 3113014

[51] Int. Cl.³ .................................................. C08G 18/48
[52] U.S. Cl. ......................................... 528/60; 528/75; 528/77
[58] Field of Search ............................. 528/60, 77, 75

[56] References Cited

U.S. PATENT DOCUMENTS 3,686,106  8/1972  Tideswell et al. ............ 528/77
3,842,036  10/1974  Chow et al. ................. 528/77
4,107,229  8/1978  Tideswell ..................... 525/502

*Primary Examiner*—Maurice J. Welsh
*Attorney, Agent, or Firm*—Toren, McGeady and Stanger

[57] ABSTRACT

The invention relates to a hardenable adhesive, which contains as effective components at least one polyol and one polyisocyanate and/or their prepolymers as well as additionally conventional additives, such as, accelerators, gluing auxiliaries, pigments and/or fillers. It is characteristic of the inventive adhesive that it contains, as a polyol, the reaction product of a novolak of average molecular weight from 300 to 1200 with an oxirane of the general formula

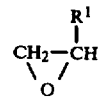

in which $R^1$ is hydrogen, or an optionally halogenated hydrocarbon group with 1 to 4 carbon atoms or the $-CH_2OR^2$ group, in which $R^2$ represents an alkyl or an alkenyl group, the $R^1$ group within the polymeric molecule being the same or different, there being added, on the average, 1 to 7 moles of the oxirane per hydroxyl group of the novolak, and the polyol and the polyisocyanate being present in such a ratio that 0.95 to 1.25 isocyanate groups of the polyisocyanate correspond to one hydroxyl group of the polyol. The inventive adhesives are liquid, adhere well to plastic surfaces and have a high peel strength. They are resistant to the effects of water and moisture.

11 Claims, 1 Drawing Figure

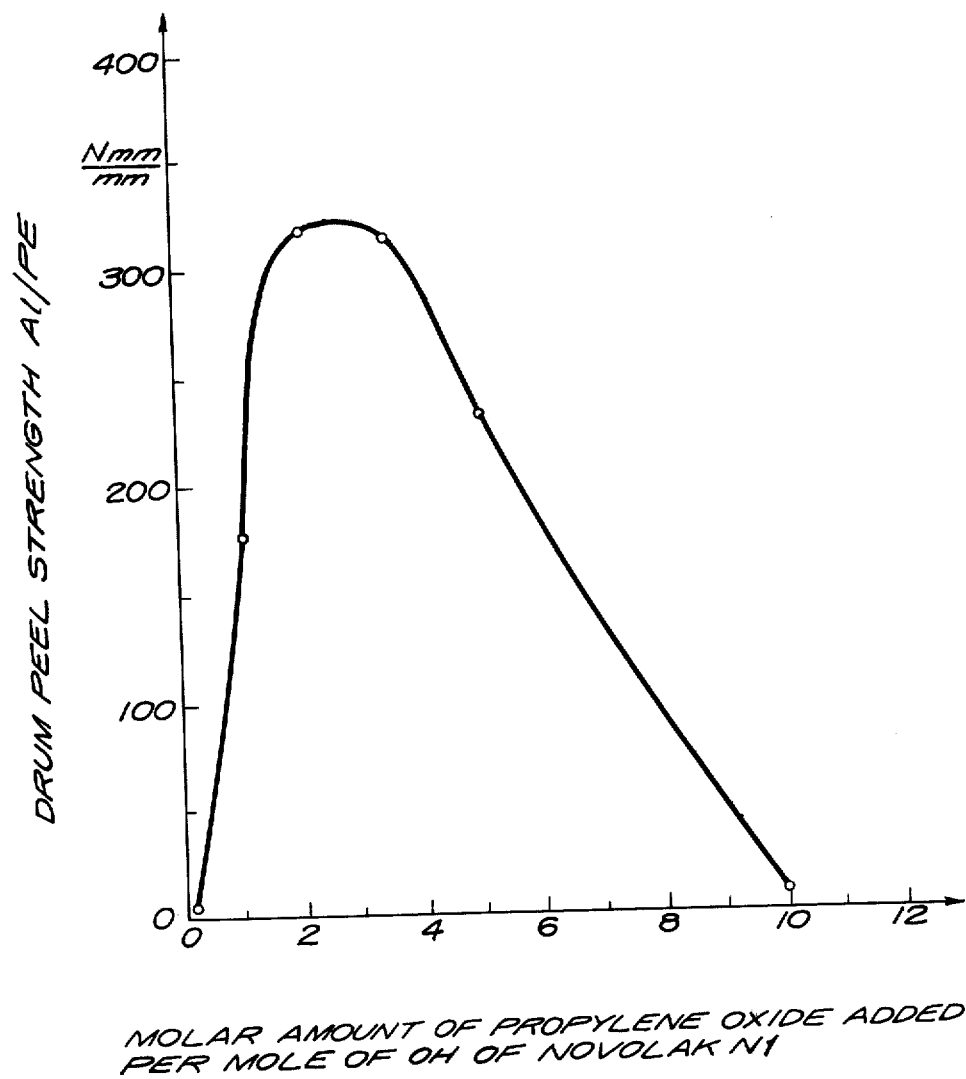

HARDENABLE ADHESIVE

BACKGROUND OF THE INVENTION

1. Field of the Invention

The invention relates to a hardenable adhesive which contains as the active component, at least one polyol and one polyisocyanate and/or their polymers, as well as the usual additives, such as, accelerators, gluing auxiliaries, pigments and/or fillers.

2. Description of the Prior Art

Hardenable adhesives, based on the reaction products of polyetherols or polyesterols with polyisocyanates or polyisocyanate prepolymers are known and described, for example, in the "Kunstoff Handbuch" (Plastics Handbook), Vol. VII, "Polyurethanes," Vieweg-Höchtlen, Carl Hanser Publishing House, Munich, 1966, page 719 ff. However, these adhesives exhibit poor adhesion to plastic surfaces when polyetherols are used as polyol component.

The products of the reaction between polyesterols and polyisocyanates or their prepolymers do adhere better to plastic surfaces. However, their adhesive properties deteriorate under the influence of moisture or water.

U.S. Pat. No. 4,107,229 discloses a coating material which is obtained by first reacting a novolak with alkylene oxide, for example, propylene oxide, and then reacting the reaction products obtained with hydroxyalkyl methacrylates and diisocyanates in styrene as a solvent. These coating materials must be hardened with peroxide. However, these coating materials are disadvantageous in that they contain a physiologically harmful solvent and that the peroxide curing is very sensitive to impurities which may be present on the substrate to be glued and in many cases may be inhibited.

German Offenlegungsschrift No. 24 40 580 discloses heat-curable resins which are obtained by first reacting a novolak with propylene oxide and esterifying the reaction product with acrylic acid or methacrylic acid. This resin also must be dissolved in a reactive solvent, such as, for example, styrene, and cured with peroxide. If novolaks are reacted only with isocyanates, products are obtained which adhere poorly and are brittle.

SUMMARY OF THE INVENTION

We have discovered a hardenable adhesive which is cured by means of an addition reaction without the use of peroxide. This adhesive adheres particularly well to plastic surfaces and is not sensitive to moisture and water.

More particularly, the adhesive of the present invention contains as a polyol, the reaction product of a novolak having an average molecular weight of 300 to 1200 with an oxirane having the general formula:

in which
$R^1$ is hydrogen or an optionally halogenated hydrocarbon group with 1 to 4 carbon atoms or the —CH$_2$OR$^2$ group,
$R^2$ represents an alkyl or an alkylene group and the $R^1$ group within the polymeric molecule is the same or different, with 1 to 7 moles of the oxirane per hydroxyl group of the novolak being added on the average, and wherein the polyol and the polyisocyanate are present in such a ratio, that 0.95 to 1.25 isocyanate groups of the polyisocyanate corresponds to one hydroxyl group of the polyol.

BRIEF DESCRIPTION OF THE DRAWING

The FIGURE is a graph of the variation in peel strength with the amount of propylene oxide added.

DESCRIPTION OF THE PREFERRED EMBODIMENT

The polyols are obtained in a known manner by the addition of oxiranes of the aforementioned formula to a novolak. Preferably used as novolak is a product which is obtained by the reaction of formaldehyde with phenol and/or alkyl phenols with 1 to 4 carbon atoms. In this connection, the methyl radical is especially preferred as the alkyl radical.

The molecular weight of the novolak should lie between 300 and 1200. The molecular weight range of 350 to 800 is preferred. The novolaks can be prepared in the conventional and known manner with the help of an acid or of salts of bivalent metals, especially salts of zinc or calcium, as a catalyst. Depending on the nature of the catalyst, novolaks are obtained with ortho and para substitution or with almost exclusively ortho substitution. A thorough explanation of the state of the art may be found in the monographs of A. Bachmann and K. Müller, "Phenoplaste" (Phenoplasts), VEB Deutscher Verlag für Grundstoffindustrie, Leipzig, 1973, and of A. Knop and W. Scheib, "Chemistry and Application of Phenolic Resins," Springer Publishing House, Berlin, Heidelberg, New York, 1979.

Oxiranes can be added in a known manner to these novolaks. These oxiranes correspond to the aforementioned formula

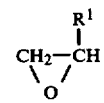

The $R^1$ group can be hydrogen, in which case the oxirane is ethylene oxide. The $R^1$ group can be an alkyl group with 1 to 4 carbon atoms. An alkyl group with 1 to 4 carbon atoms, and especially with 1 to 2 carbon atoms, is preferred. If $R^1$ is a methyl group, the oxirane is propylene oxide. The alkyl may optionally be halogenated and contain, for example, chlorine atoms. Examples of such a halogenated $R^1$ group are the CH$_2$Cl— and the CH$_2$CCl$_3$— groups. The alkyl group may also be unsaturated. Examples of such unsaturated groups are the vinyl and the allyl groups.

The $R^1$ group may also represent the —CH$_2$—O—R$^2$ group, in which R$^2$ is an alkyl or an alkenyl group. The butyl group is an example of a suitable alkyl group and the vinyl or allyl group is an example of a suitable alkenyl group.

Apart from the already mentioned ethylene oxide and propylene oxide, the following compounds may be used, for example, as oxiranes, butylene oxide, isobutylene oxide, epichlorohydrin, epibromohydrin, trifluoromethylethylene oxide, 1,2-dichloro-3,4-epoxybutane, 1,1-dichloro-2,3-epoxybutane, 1,1,1-trichloro-3,4-epoxybutane, methyl glycidyl ether, ethyl glycidyl ether, isopropyl glycidyl ether, tert.-butyl glycidyl ether, n-hexyl glycidyl ether, ethylhexyl glycidyl ether, phenyl glycidyl ether, chlorophenyl glycidyl ether, nitrophenyl glycidyl ether, vinyl glycidyl ether, allyl glycidyl ether and butadiene monoxide.

The $R^1$ group can have the same or a different meaning within the polymeric molecule.

Propylene oxide is preferredly used as oxirane.

The oxirane is added in such amounts that 2 to 4 moles of the oxiranes are present per hydroxyl group of the novolak. As addition catalysts, the catalysts known from the state of the art, and especially basic catalysts, such as, for example, sodium methylate, potassium hydroxide or calcium hydroxide can be used. Additionally, acidic catalysts, such as, for example, boron trifluoride etherate may be used.

The polyols thus prepared, correspond to the following simplified average formula:

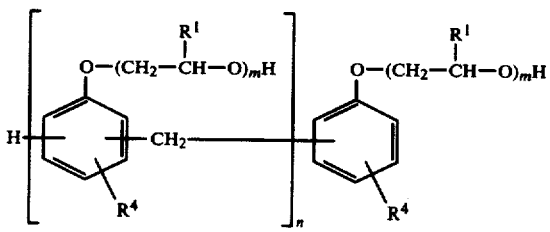

In this formula, $R^1$ has the above-mentioned meaning. $R^4$ is hydrogen or an alkyl radical with 1 to 4 carbon atoms, especially the methyl radical. The index m has a value of 1 to 7, this value referring to the average molecule. The index n has a value of about 2 to 10.

Up to 85 weight percent of the polyol, obtained by reacting a novolak with an oxirane, may be replaced by different polyhydroxy compound. Such polyhydroxy compounds are di- or polyfunctional polyalkyleneoxide derivatives, such as are obtained, for example, by the addition of oxiranes to aliphatic alcohols with at least two hydroxyl groups. Known polyesterols, as well as castor oil, can also be used. Moreover, low molecular polyacrylate polymers or copolymers with at least two hydroxyl groups can be used. By means of these additives, it is possible to modify the properties of the adhesives in the desired manner and, for example, to make them more flexible or to lower their viscosity.

As polyisocyanates, generally the polyisocyanates known from the state of the art may be used. Preferably, polyisocyanates of the following formula are used:

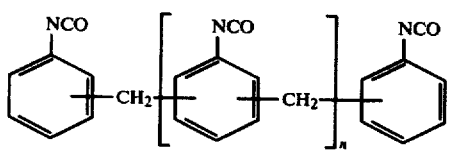

in which n is not greater than 3
or

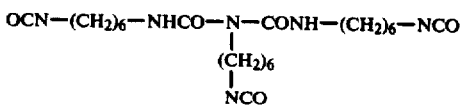

or

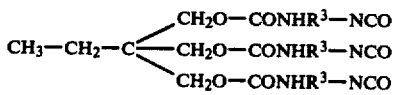

in which $R^3$ represents the

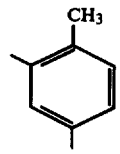

or the

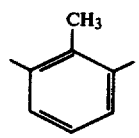

radical.

These isocyanates are commercially available. However, other polyisocyanates, such as, for example, 1,6-hexamethylenediisocyanate, 2,4,4-trimethyl-1,6-hexamethylenediisocyanate, 3-isocyanatomethyl-3,5,5-trimethylcyclohexylisocyanate, 1,4-tetramethylenediisocyanate, 2,4- and 2,6-hexahydrotoluylenediisocyanate, hexahydro-1,3- and -1,4-phenylenediisocyanate, 1,3- and 1,4-phenylenediisocyanate, 2,4- and 2,6-toluylenediisocyanate, 4,4'-diisocyanatodiphenylmethane, 1,5-naphthylenediisocyanate, m-xylylenediisocyanate, tris-(4-isocyanatophenyl)-thiophosphate, 4,4',4"-triisocyanatotriphenylmethane, 2,4,6-triisocyanatotoluene or 2,4,4'-triisocyanatodiphenylether are also suitable. The isocyanates must however fulfill the condition that, on the average, they have at least two isocyanate groups per molecule.

As prepolymers of the isocyanates, their partial reaction products with polyether or polyester polyols of a molecular weight less than 2000 can be used, the polyether or polyester polyols having on the average at least two hydroxyl groups per molecule and the polyisocyanate being reacted with these polyols in such a ratio that 1.5 to 3 isocyanate groups correspond to one hydroxyl group.

Examples of suitable polyetherols are linear or branched polyetherols based on ethylene oxide, propylene oxide and butylene oxide, polythioethers and adducts of ethylene oxide on polyamines and alkoxylated phosphoric acids.

Examples of suitable polyesterols are linear or branched polyesterols, such as those obtained in the usual manner from multifunctional, preferably bifunctional, carboxylic acids, such as, adipic acid, sebacic acid, phthalic acid, halogenated phthalic acids, maleic acid, 1,2,4-benzenetricarboxylic acid, monomeric, dimeric or trimeric fatty acids and multihydric alcohols, such as, for example, ethylene glycol, polyethyleneglycol, propylene glycol, polypropyleneglycol, 1,3- and 1,4-butanediol, 2,2-dimethylpropane-1,3-diol. 1,6-hexanediol, 1,1,1-trimethylolpropane, hexanetriols or glycerin.

The reaction of the polyisocyanates with the polyetherols or the polyesterols is carried out in such a ratio, that there are, on the average, at least two isocyanate groups in each molecule of the reaction product.

The hardening time or hardening temperature of the adhesive can be reduced or decreased significantly in a known manner by the addition of an accelerator. Especially preferred is therefore an adhesive which contains as an accelerator up to 2 weight percent, based on the sum of the polyols and the polyisocyanates, of a tertiary amine and/or an organic tin compound. As tertiary amines, especially dimethylbenzylamine, dicyclohexylmethylamine, dimethylpiperazine, dimethylaminoethanol, 1,2-dimethylimidazole, N-methyl- or N-ethylmorpholine, dimethylcyclohexylamine, 1-aza-bicylco-(3,3,0)-octane or 1,4-diaza-bicyclo-(2,2,2)-octane are suitable. Examples of readily usable organic tin compounds are dibutyl tin dilaurate, or tin(II) octoate.

As auxiliaries, pigments and/or fillers can also be added to the adhesive. For this purpose, inorganic as well as organic products, such as, for example, titanium dioxide, iron oxide, chromium oxide, barium sulfate, quartz powder, talc, calcium carbonate, Neuburg silica or bentonite are suitable.

The inventive adhesives harden already at room temperature or at moderately elevated temperatures. Since the adhesives are liquid, the use of a solvent is not necessary. If it is desirable that the preparation has a low viscosity, inert solvents, such as, for example, lower ketones, ethers, esters or aromatic solvents can be used.

The good adhesive properties of the inventive adhesives were surprising, since, as stated above, reaction products of novolaks with isocyanates are brittle, adhere poorly to plastic surfaces and are therefore not suitable as adhesives. On the other hand, as stated above, those skilled in the art knew that reaction products of polyetherols and polyisocyanates also exhibit poor adhesion to plastic surfaces. It therefore had to be surprising that reaction products of novolaks and oxiranes permitted adhesives with excellent properties to be prepared with polyisocyanates. In this connection, however, it is of significant importance that novolaks with a molecular weight range of 300 to 1200, are used and that, on the average, 1 to 7 moles of oxirane are added per hydroxyl group of the novolak. At higher or lower amounts of oxirane, the adhesive properties become worse. The adhesive properties are at a maximum, when 2 to 4 moles of the oxirane are added per hydroxyl group of the novolak.

The following examples illustrate the present invention. All quantity data in the examples refers to parts by weight.

PREPARATION OF THE NOVOLAK

A solution of 237 g of 37% formalin and 4.6 g of oxalic acid is added dropwise, with stirring and within one hour to 424 g of phenol at 90° C. The reaction mixture is heated for a further three hours at 90° C. After cooling, the aqueous phase is separated off. The organic phase is washed several times with water in order to remove the oxalic acid and is then concentrated under vacuum at 150° C., until the unreacted phenol has been largely distilled over. A novolak (351 g) is obtained in solid form. It has a hydroxyl number of 605 mg KOH/g and an average molecular weight, measured in a vapor phase osmometer, of 460. The novolak obtained is named N 1.

Additional novolaks are prepared according to the following batch formulations:

|  | Novolak | | |
| --- | --- | --- | --- |
|  | N 2 | N 3 | N 4 |
| phenol | 471 g | 424 g | 283 g |
| tert.butylphenol | — | — | 141 g |
| 37% formalin | 203 g | 292 g | 206 g |
| oxalic acid | 4.9 g | 7.1 g | 4.7 g |

The novolaks obtained have the following specifications:

|  | Novolak | | |
| --- | --- | --- | --- |
|  | N 2 | N 3 | N 4 |
| hydroxyl number | 620 | 610 | 540 |
| average molecular weight | 380 | 620 | 420 |

PREPARATION OF THE POLYOLS FROM NOVOLAKS AND OXIRANES

The novolak N 1 (74 g) is dissolved in 93 g of propylene oxide, mixed with 0.24 g of potassium methylate and heated in an autoclave within one hour to a temperature of 140° C. The temperature is maintained until almost all of the propylene oxide has been added and the pressure in the reaction vessel has fallen again. This is the case after about six hours.

After cooling, the slight amount of unreacted propylene oxide is drawn off under vacuum at 80° C., the product is neutralized with phosphoric acid and the salt formed is removed. The dried polyol which is obtained in almost a 100% yield, has a hydroxyl number of 266 mg KOH/g and an average molecular weight of 772, as determined by gel chromatographic analysis. On the average, the polyol contains 2 moles of propylene oxide per mole of hydroxyl group of the novolak N 1. The polyol is highly viscous at room temperature, but still flowable.

Additional polyols are prepared in a similar manner from the novolaks N 1 to N 4 and propylene oxide or other oxiranes. They are listed in Table 1. In this connection, the reaction of novolaks with oxiranes can also be carried out in suitable, inert solvents, such as, for example, ethylene glycol dimethyl ether. The use of boron trifluoride etherate instead of potassium methylate as catalyst is recommended in the case of halogen-containing oxiranes, such as, epichlorohydrin.

PREPARATION OF THE INVENTIVE ADHESIVES AND TESTING THE ADHESIVE PROPERTIES

(a) Preparation of the Adhesives from Polyols and Polyisocyanates

The inventive adhesives are prepared by mixing the polyols with different polyisocyanates in the mixing ratios given. As a rule, the polyols are used in solvent-free form. Should low processing viscosities of the adhesives be required, inert solvents, such as, esters, ketones or aromatics can be used as diluents.

As polyisocyanates, four common commercial products are used as follows: designated as $b_1$, a polyphenyl polymethylene polyisocyanate (crude MDI) having the general formula

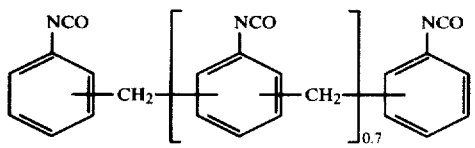

designated as $b_2$, a triisocyanate having the formula

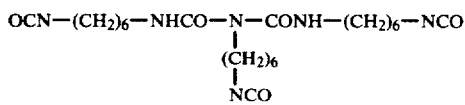

Both polyisocyanates are used in solvent-free form. Designated as $b_3$, a polyisocyanate having the formula

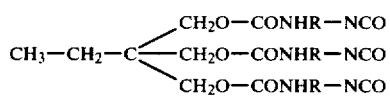

in which R represents the

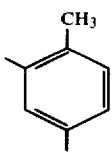

and/or the

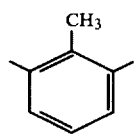

radical is used and is available as a 75 weight percent solution in ethyl acetate.

Designated as $b_4$, a 60 weight percent solution in methyl ethyl ketone of the reaction product of 3 moles of 2,4-toluylenediisocyanate and 1 mole of a trifunctional polyesterol with a molecular weight of 600, obtained from adipic acid, ethylene glycol, 2,2-dimethylpropane-1,3-diol and trimethylolpropane, is used.

The content of free isocyanate groups, based on the solids, is:

polyisocyanate $b_1$—31.2 weight percent
polyisocyanate $b_2$—22.7 weight percent
polyisocyanate $b_3$—13.0 weight percent
polyisocyanate $b_4$—11.2 weight percent.

Further additives, such as, accelerators, gluing auxiliaries, pigments and fillers, can be dissolved or dispersed, these additives being advisably added to the polyol before admixture with the polyisocyanate.

The exact formulations of the adhesives are given in Table 1. Formulations Nos. 1 to 12 are adhesives in accordance with the invention and formulations 13 to 17 are comparison compositions.

Comparison adhesive No. 13 contains a difunctional polyetherol based on propylene and ethylene oxides with a hydroxyl number of 90 mg KOH/g instead of the inventive polyols. Comparison adhesive No. 14 contains a polyesterol with a functionality of ca. 2.5 and a hydroxyl number of 109 mg KOH/g instead of the inventive polyols. The polyester was obtained by condensation of adipic acid with diethylene glycol, ethylene glycol and trimethylolpropane.

Formulations No. 15 and No. 16 contain the adhesives of U.S. Pat. No. 4,107,229 and German Offenlegungsschrift No. 24 40 580, respectively. These are adhesives which are hardened with peroxide and contain larger amounts of styrene as the reactive solvent. Comparison adhesive No. 17 contains novolak N 1 as the polyol component.

(b) Testing the Adhesive Properties

The drum peel strength test of DIN 53 295 is enlisted for testing the use properties of the adhesives. The drum peel strength is determined with two different composites:

aluminum/polyethylene composite (PE)
aluminum/epoxide resin-glass fiber-laminate composite (GFK)

The sheet aluminum is of quality Al Cu Mg 2pl and, before being glued, is subjected to a chromate/sulfuric acid pickling process. The polyethylene is roughened and pretreated and the epoxide resin-glass fiber-laminate (GFK) is abraded.

The adhesives are applied on the substrate in an amount of 60 g/m² solids and the solvents, insofar as they are present, are evaporated off at room temperature or at an elevated temperature, for example, at 70° C. The adhesives are hardened for 20 minutes at 90° C. under a pressure of 0.5 N/mm². The test pieces are then cooled and peeled at 20° C.

An additional hot-water storage at 95° C. over three days is carried out with the aluminum/GFK test pieces. Before the peel test, these test pieces are cooled in water to 20° C. and peeled while still moist. The hot-water storage is very suitable as an accelerated test for testing the resistance of the adhesives to water and moisture.

The strength values obtained are given in Table 2. It is evident from these values that comparison adhesive No. 13, which contains a polyetherol, gives lesser strengths because it adheres poorly. Comparison adhesive No. 14 which is based on a polyesterol, admittedly adheres somewhat better to polyethylene and glass fiber laminate. However, the strength falls off in the hot-water test. The two comparison adhesives No. 15 and No. 16, which are cured with peroxide, also give low strengths, as does adhesive No. 17, which contains the pure novolak N 1 as polyol component.

The peel strength of the aluminum/polyethylene composite is given as a function of the amount of propylene oxide, added to the novolak N 1, in the drawing. Polyisocyanate $b_1$ was used as polyisocyanate component. It can be seen that high strengths are obtained only in a narrow range of propylene oxide added.

TABLE 1

| Formulation No. | Polyol Novolak | Polyol Molar amount of oxirane added per mole of novolak OH | OH number of polyol | Parts by weight of polyol | Polyisocyanate parts by weight | | Mole Ratio OH:NCO | Other Additives parts by weight |
|---|---|---|---|---|---|---|---|---|
| | | | ADHESIVE FORMULATIONS | | | | | |
| | | Inventive Adhesives | | | | | | |
| 1 | N 1 | 2.0 propylene oxide | 266 | 100 | 70.2 | b₁ | 1:1.1 | — |
| 2 | N 1 | 3.5 propylene oxide | 185 | 100 | 53.3 | b₁ | 1:1.2 | — |
| 3 | N 1 | 2.0 propylene oxide | 266 | 100 | 92.2 | b₂ | 1:1.05 | 0.02 dibutyl tin dilaurate |
| 4 | N 1 | 2.0 propylene oxide | 266 | 100 | 160.9 | b₃ | 1:1.05 | — |
| 5 | N 1 | 2.0 propylene oxide | 266 | 100 | 177.9 | b₄ | 1:1.0 | — |
| 6 | N 2 | 2.5 propylene oxide | 233 | 85 | 67.1 | b₁ | 1:1.1 | 15 polyethyleneglycol MW 300 |
| 7 | N 3 | 3.0 propylene oxide | 203 | 100 | 53.6 | b₁ | 1:1.1 | — |
| 8 | N 4 | 2.0 propylene oxide | 260 | 100 | 65.5 | b₁ | 1:1.05 | 20 titanium dioxide |
| 9 | N 1 | 3.5 epichlorohydrin | 141 | 100 | 37.2 | b₁ | 1:1.1 | — |
| 10 | N 2 | 3.5 epichlorohydrin | 143 | 100 | 37.7 | b₁ | 1:1.1 | — |
| 11 | N 1 | 3.0 ethylene oxide | 255 | 90 | 69.3 | b₁ | 1:1.1 | 10 polypropyleneglycol MW 300 |
| 12 | N 1 | 2.0 propylene oxide | 266 | 50 | 61.3 | b₁ | 1:1.2 | 50 castor oil + 100 calcium carbonate |
| | | Comparison adhesives, not of the invention | | | | | | |
| 13 | — | polyetherol | 90 | 100 | 23.8 | b₁ | 1:1.1 | — |
| 14 | — | polyesterol | 109 | 100 | 28.8 | b₁ | 1:1.1 | — |
| 15 | — | adhesive of U.S. Pat. No. 4,107,229, Examples 1 and 7 | — | — | — | | — | — |
| 16 | — | adhesive of DE-OS 24 40 580 Examples 1 to 3 | — | — | — | | — | — |
| 17 | — | Novolak N 1 | 605 | 100 | 159.7 | b₁ | 1:1.1 | 80 acetone |

TABLE 2

USE TEST OF THE ADHESIVES

| Adhesive Formulation No. | Drum Peel Strength according to DIN 53 295 Nmm/mm | | |
|---|---|---|---|
| | Al/PE | Al/GFK | Al/GFK after storing for 3 days in hot water |
| 1 | 318 | 73 | 65 |
| 2 | 313 | 76 | 67 |
| 3 | 255 | 65 | 60 |
| 4 | 241 | 62 | 58 |
| 5 | 243 | 59 | 55 |
| 6 | 276 | 75 | 68 |
| 7 | 265 | 71 | 63 |
| 8 | 265 | 70 | 62 |
| 9 | 281 | 72 | 62 |
| 10 | 272 | 68 | 60 |
| 11 | 290 | 70 | 61 |
| 12 | 320 | 65 | 62 |
| Comparison Adhesive | | | |
| 13 | 5 | 3 | 2 |
| 14 | 145 | 39 | 15 |
| 15 | 10 | 12 | 6 |
| 16 | 12 | 14 | 8 |
| 17 | 8 | 5 | 2 |

We claim:

1. A hardenable adhesive comprising at least one polyol, one polyisocyanate or their prepolymers wherein the polyol is the reaction product of a novolak of average molecular weight from 300 to 1200 with an oxirane having the general formula

in which $R^1$ is hydrogen, a halogenated hydrocarbon group with 1 to 4 carbon atoms or the $-CH_2OR^2$ group, in which $R^2$ represents an alkyl or an alkenyl group, the $R^1$ group within the polymeric molecule being the same or different, and having on the average 1 to 7 moles of the oxirane per hydroxyl group of the novolak, the polyol and the polyisocyanate being present in such a ratio that 0.95 to 1.25 isocyanate groups of the polyisocyanate correspond to one hydroxyl group of the polyol.

2. The adhesive of claim 1 further comprising conventional additives selected from the group consisting of accelerators, gluing auxiliaries, pigments and fillers.

3. The adhesive of claim 1 wherein the novolak used for the reaction with the oxirane is obtained by the reaction of formaldehyde with phenol or alkyl phenols having 1 to 4 carbon atoms in the alkyl radical in a molar ratio of phenol to formaldehyde of about 1:0.5 to 1:0.95.

4. The adhesive of claim 1 or 2 wherein the oxirane has a molecular weight from about 350 to 800.

5. The adhesive of claim 1 or 2 wherein the polyol is the reaction product of a novolak with an oxirane and wherein on the average, 2 to 4 moles of oxirane having been added per hydroxyl group of the novolak.

6. The adhesive of claim 1 or 2 wherein the polyol is the reaction product of a novolak with propylene oxide.

7. The adhesive of claim 1 or 2 wherein up to about 85 weight percent of the polyol are replaced by a compound selected from the group consisting of di- or polyfunctional aliphatic polyalkyleneoxide derivatives, polyesterols, castor oil, and low molecular polyacrylates, each having at least two hydroxyl groups.

8. The adhesive of claim 1 or 2 wherein the polyisocyanates have the general formula

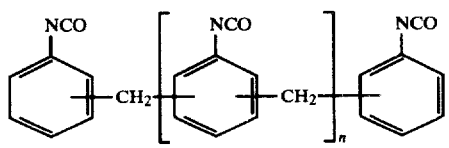

in which n is not greater than 3;

or

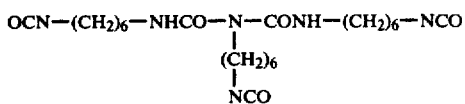

or

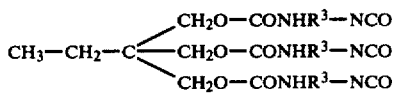

in which R³ represents the

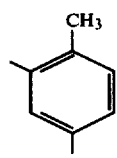

or the

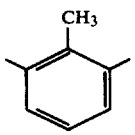

radical.

9. The adhesive of claim 1 or 2 wherein the polyisocyanates are partial reaction products of one or several polyisocyanates with polyether polyols or polyester polyols having a molecular weight of less than 2000, the polyether or polyester polyols having at least two hydroxyl groups on the average and the polyisocyanates being reacted with these polyols in such a ratio that 1.5 to 3 isocyanate groups correspond to one hydroxyl group.

10. The adhesive of claim 1 or 2 wherein an accelerator selected from the group consisting of a tertiary amine and organic tin compounds in an amount up to 2 weight percent based on the sum of the polyols and the polyisocyanates is present.

11. The adhesive of claim 1 or 2 wherein the polyol has the formula

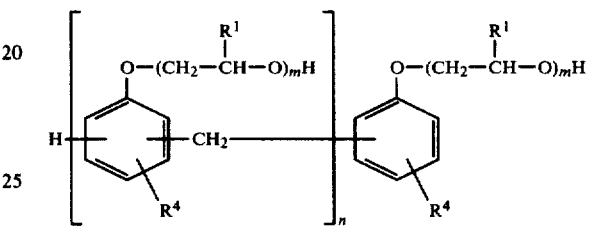

wherein

R⁴ is hydrogen or an alkyl radical with 1 to 4 carbon atoms, m is from 1 to 7 and n is 2 to 10.

* * * * *